(12) United States Patent
Choi et al.

(10) Patent No.: US 11,958,755 B2
(45) Date of Patent: Apr. 16, 2024

(54) BARIUM TITANATE POWDER AND MANUFACTURING THEREOF

(71) Applicant: Korea Institute of Ceramic Engineering & Technology, Jinju-si (KR)

(72) Inventors: Moon Hee Choi, Jinju-si (KR); Hyeon Jin Jung, Jinju-si (KR); Seong Hyeok Choi, Ulsan (KR)

(73) Assignee: Korea Inst. of Ceramic Engineering & Technology, Jinju-Si (KR)

( * ) Notice: Subject to any disclaimer, the term of this patent is extended or adjusted under 35 U.S.C. 154(b) by 0 days.

(21) Appl. No.: 17/746,125

(22) Filed: May 17, 2022

(65) Prior Publication Data

US 2022/0411278 A1 Dec. 29, 2022

(30) Foreign Application Priority Data

Jun. 23, 2021 (KR) ........................ 10-2021-0081582

(51) Int. Cl.
*C01G 23/00* (2006.01)

(52) U.S. Cl.
CPC ........ *C01G 23/006* (2013.01); *C01P 2002/72* (2013.01); *C01P 2002/77* (2013.01); *C01P 2002/90* (2013.01); *C01P 2004/01* (2013.01); *C01P 2004/32* (2013.01); *C01P 2004/51* (2013.01); *C01P 2004/54* (2013.01); *C01P 2004/62* (2013.01); *C01P 2004/64* (2013.01)

(58) Field of Classification Search
CPC .................................................... C01G 23/006
See application file for complete search history.

(56) References Cited

U.S. PATENT DOCUMENTS

2012/0141790 A1* 6/2012 Kim ..................... C01G 23/006
                                                             977/773

FOREIGN PATENT DOCUMENTS

CN            110615467 A    * 12/2019

* cited by examiner

*Primary Examiner* — James A Fiorito
(74) *Attorney, Agent, or Firm* — The H.T. Than Law Group

(57) ABSTRACT

Provided are a barium titanate powder having spherical shape fine particles which have an average particle diameter ($D_{50}$) in a range of about 140-270 nm, a tetragonal structure having a markedly improved tetragonality (c/a) in a range of 1.007-1.01 in contrast to the conventional composition, and at the same time, a markedly improved crystallinity in a range of 93-96%, thereby showing improved dielectric properties, and a manufacturing method thereof.

13 Claims, 8 Drawing Sheets

(A)

(B)

(A)  (B)

(A)

(B)

BARIUM TITANATE POWDER AND MANUFACTURING THEREOF

BACKGROUND

The present disclosure relates to a barium titanate (BaTiO$_3$) powder and a manufacturing method thereof, and more particularly, to a barium titanate powder having improved dielectric properties by being spherical particles with an average particle diameter (D$_{50}$) in a range of about 140-270 nm and having both of markedly improved tetragonality (c/a) and crystallinity, and a manufacturing method thereof.

Multilayer ceramic capacitors (MLCC) occupying 70% or more of the whole capacitor market are general-purpose passive element components which are essentially used in all electronic products. Generally, for the manufacture of such MLCC, a barium titanate (BaTiO$_3$) ferroelectric powder is most widely used.

If MLCC are applied to IT parts, in order to adjust a limited mounting space according to the miniaturization and integration of IT parts, the ultra-thinning and super stacking of MLCC dielectric layers are required. In order to satisfy the requirements, the most important point is forming a dielectric layer of a thin layer by atomizing the barium titanate powder particles as much as possible.

On the contrary, if the MLCC are applied to electronic device parts such as vehicles and industrial equipment, there is no limitation on a mounting space like the IT parts, but high reliability of dielectric properties is required instead. For example, Automotive Electronic Council (AEC) imposes strict certification standards (AEC-Q200) under very severe environments for the properties of parts for vehicles such as a capacitor.

Generally, as a typical manufacturing method of a barium titanate ferroelectric powder, a solid phase synthesis and a hydrothermal synthesis may be discussed.

The latter hydrothermal synthesis is a manufacturing method by treating a mixture of a gel phase hydrate of titanium and a barium hydroxide aqueous solution under a high temperature and a high pressure. In the hydrothermal synthesis, a minute powder having narrow particle size distribution at a relatively low temperature could be obtained when compared to the former solid phase synthesis which requires calcination at a high temperature and sintering processes above all, so that effective atomization may be achieved and hence particularly it is widely used for the manufacture of the above-described MLCC for IT parts. On the contrary, the former solid phase synthesis is a general oxide mixing method, and has relatively high reliability of dielectric properties of the powder thus manufactured when compared to the hydrothermal synthesis, so that it is suitable for the manufacture of MLCC for electronic devices.

FIG. 1 is an electron micrograph, where (A) shows a microstructure of a MLCC specimen in which a BaTiO$_3$ powder manufactured by a general hydrothermal synthesis is applied, and (B) shows a microstructure of a MLCC specimen in which a BaTiO$_3$ powder manufactured by a general solid phase synthesis is applied.

In addition, FIG. 2 is a graph comparing reliability evaluation (highly accelerated life test (HALT)) results on each MLCC manufactured using the BaTiO$_3$ powder manufactured by a hydrothermal synthesis (A) and the BaTiO$_3$ powder manufactured by a solid phase synthesis (B) of FIG. 1.

In addition, FIG. 3 shows tetragonality (c/a) and crystallinity in accordance with various temperature conditions for calcination heat treatment of the BaTiO$_3$ powder manufactured by a solid phase synthesis (B) of FIG. 1, and the x-axis means Calcination heat treatment temperature×Holding time at the temperature. Generally, the tetragonality is the axial ratio of c/a between tetragonal lattice constants c and a, which represents the degree of tetragonality of BaTiO$_3$, and the crystallinity is the ratio (%) of an actual value in contrast to a theoretical value at the full width at half maximum (FWHM) of the (101) main peak in the X-ray diffraction results of BaTiO$_3$.

Referring to FIG. 1 and FIG. 2, the case of the BaTiO$_3$ powder (A of FIG. 1) manufactured by the hydrothermal synthesis appeared to be much more atomized in contrast to the BaTiO$_3$ particles (B) manufactured by the solid phase synthesis, but the presence of a significant number of pores were observed in the microstructure (FIG. 1). The internal defects like such pores induce fails within a short time (failure time) in the MLCC manufactured (A of FIG. 2). On the contrary, in the case of the BaTiO$_3$ powder (B of FIG. 1) manufactured by the solid phase synthesis, it was confirmed that such a failure time was significantly long and the reliability was relatively higher than the one by the hydrothermal synthesis (B of FIG. 2), and accordingly it was found to be relatively suitable for MLCC for electronic devices.

However, as shown particularly in FIG. 3, the BaTiO$_3$ powder manufactured by the conventional solid phase synthesis has problems in that it does not have good general characteristics such as its tetragonality (c/a) and the crystallinity being not constant over various calcination temperature conditions and having low degrees on the whole and thus a reliable manufacturing is difficult. Particularly, for the application to MLCC, the tetragonality (c/a) is required to be a value of about 1.0070 or more at 300 k, and according to FIG. 3, only the BaTiO$_3$ powder calcined under holding conditions of 1000° C. for 3 hours ("arrow" part) among various manufacturing conditions is applicable to the MLCC.

As described above, for the application to MLCC for electronic devices, the development of BaTiO$_3$ powder having high reliability and high tetragonality (c/a) is required.

PRIOR ART DOCUMENTS

Patent Documents (Patent Document 1) 1. Korean Laid-open Patent Publication No. 10-2004-0069044 (published on Aug. 4, 2004)
(Patent Document 2) 2. Korean Laid-open Patent Publication No. 10-2014-0015073 (published on Feb. 6, 2014)
(Patent Document 3) 3. Korean Laid-open Patent Publication No. 2002-0053749 (published on Jul. 5, 2002)

SUMMARY

Accordingly, the present disclosure provides a barium titanate powder having improved dielectric properties by being spherical particles with an average particle diameter (D$_{50}$) in a range of about 140-270 nm and having both of markedly improved tetragonality (c/a) and crystallinity, and a manufacturing method thereof.

To solve the above tasks, an aspect of the present disclosure provides a manufacturing method of a barium titanate powder, including mixing a barium carbonate (BaCO$_3$) powder, a titanium dioxide (TiO$_2$) powder, and a barium titanate (BaTiO$_3$) ultra-fine powder, as raw material powders, where an average particle diameter (D$_{50}$) of the barium titanate ultra-fine powder is selected in a range of 20-120 nm, and heating the mixture powder thus mixed to obtain a final barium titanate powder.

In addition, selectively, an average particle diameter ($D_{50}$) of the barium carbonate powder may be set in a range of 70-300 nm. In addition, an average particle diameter ($D_{50}$) of the titanium dioxide powder may be set in a range of 80-170 nm.

In addition, selectively, the amount of the barium titanate ultra-fine powder may be set in a range of 5-95 wt %, more preferably, in a range of 25-50 wt % based on a total weight of the mixture powder.

In addition, selectively, the mixing may include mixing by pre-mixing the barium carbonate powder, the titanium dioxide powder and the barium titanate ultra-fine powder in a solvent for a pre-determined time, and then, milling. In addition, the solvent in the pre-mixing may be one or more among ethanol and de-ionized water, and the solvent may include a dispersant.

In addition, selectively, the heating may be performed in a temperature range of 900-1000° C. In addition, the heating may be performed in the temperature range for 1-4 hours. In addition, the heating may be performed in the air.

In addition, selectively, the barium titanate ultra-fine powder may be prepared by a hydrothermal synthesis.

In addition, selectively, the final barium titanate powder obtained by the heating may have an average particle diameter ($D_{50}$) in a range of 140-270 nm, and may be classified by sieving in a predetermined average particle diameter ($D_{50}$) range.

In addition, another aspect of the present disclosure provides a barium titanate powder which corresponds to fine particles having an average particle diameter ($D_{50}$) in a range of 140-270 nm and has a tetragonal structure with a tetragonality (c/a) in a range of 1.007-1.01. In addition, the barium titanate powder may have a crystallinity in a range of 93-96%. In addition, the particles of the barium titanate powder may have a spherical or pseudo spherical shape having an aspect ratio in a range of 1:1.090-1:1.500.

BRIEF DESCRIPTION OF THE DRAWINGS

Exemplary embodiments can be understood in more detail from the following description taken in conjunction with the accompanying drawings, in which:

FIGS. 9A and 9B show evaluation graphs on the dielectric properties of chips manufactured by manufacturing a dielectric sheet using a $BaTiO_3$ powder of the composition of [$BaCO_3$ raw material powder+$TiO_2$ raw material powder+25 wt % of $BaTiO_3$ ultra-fine powder] of FIG. 5A according to an embodiment of the present disclosure, laminating the sheets, and sintering them under holding conditions of about 1300° C. for 2 hours, wherein FIG. 9A shows the change of dielectric properties, and FIG. 9B shows the change of dielectric loss, and the changes of the properties of dielectricity ($\varepsilon_r$) and dielectric loss (tan δ) of the conventional $BaTiO_3$ powder manufactured by the conventional solid phase synthesis are shown together as a comparative embodiment.

DETAILED DESCRIPTION OF EMBODIMENTS

Figure 1:
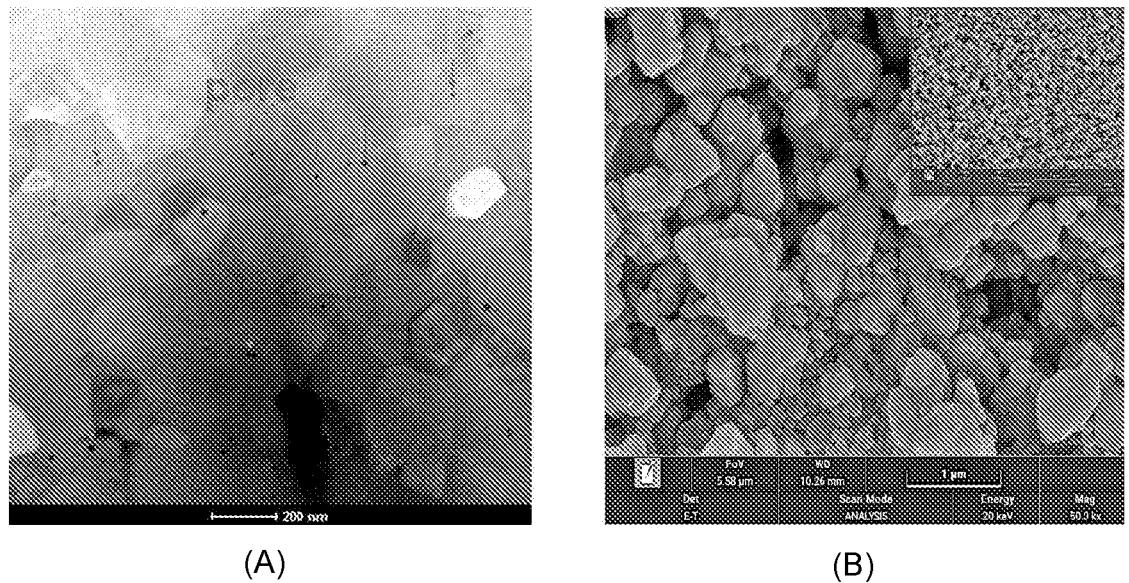
FIG. 1 is an electron micrograph, where (A) shows a microstructure of a MLCC specimen in which a $BaTiO_3$ powder manufactured by a general hydrothermal synthesis is applied, and (B) shows a microstructure of a MLCC specimen in which a $BaTiO_3$ powder manufactured by a general solid phase synthesis is applied.
Figure 2:
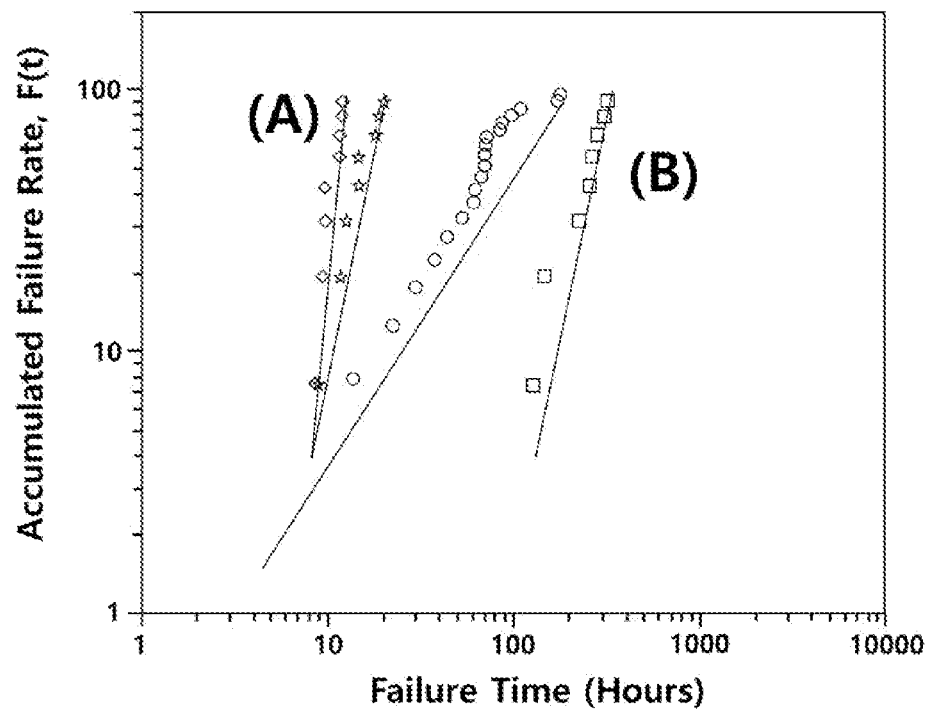
FIG. 2 is a graph comparing reliability evaluation (highly accelerated life test (HALT)) results on each MLCC manufactured using the $BaTiO_3$ powder manufactured by a common hydrothermal synthesis (A) and the $BaTiO_3$ powder manufactured by a solid phase synthesis (B) of FIG. 1.

As described above, the conventional $BaTiO_3$ powder manufactured by the conventional solid phase synthesis has low and non-constant values of tetragonality (c/a) and crystallinity on the whole, and is not easy to apply to MLCC for electronic devices, which requires high reliability and high tetragonality.

In addition, the $BaTiO_3$ powder manufactured by the conventional hydrothermal synthesis is available for atomization, but due to internal defects such as lots of pores, the reliability is low, and the dielectric properties are low as being a cubic structure, and likewise, it is not easy to apply to MLCC for electronic devices which require high reliability and high tetragonality.

As a method for solving the above matters, the present disclosure may manufacture a $BaTiO_3$ powder with both improved tetragonality (c/a) and crystallinity, by mixing a $BaCO_3$ powder and a $TiO_2$ powder, which are raw material powders generally used for the solid phase synthesis of $BaTiO_3$, together with a $BaTiO_3$ ultra-fine powder, and synthesizing by heating by a solid phase synthesis.

In the present disclosure, the average particle diameter ($D_{50}$) of the $BaTiO_3$ ultra-fine powder is in a range of about 20-120 nm, preferably, in a range of about 50-70 nm. In addition, in the present disclosure, the average diameter of the $BaCO_3$ raw material powder is in a range of about 70-300 nm, preferably, in a range of about 120-285 nm. In addition, in the present disclosure, the average diameter of the $TiO_2$ raw material powder is in a range of about 80-170 nm.

According to the present disclosure, the $BaTiO_3$ ultra-fine powder particles are present among the $BaCO_3$ powder particles and $TiO_2$ powder particles, which are relatively large, during heating in the mixture, and the growth of the $BaTiO_3$ particles being synthesized and produced therefrom is suppressed to improve the densification. In addition, the $BaTiO_3$ ultra-fine powder particles serve as a kind of seed to improve sinterability, so that both the tetragonality (c/a) and crystallinity of the finally produced $BaTiO_3$ powder particles may be improved.

The $BaTiO_3$ powder particles manufactured according to the present disclosure are fine particles having an average particle diameter ($D_{50}$) in a range of about 140-270 nm. This corresponds to the atomization degree close to the advantages of the conventional hydrothermal synthesis by which $BaTiO_3$ powder particles in an average particle diameter range of 120-200 nm are reported to be manufactured to accomplish a dense microstructure.

Particularly, though the $BaTiO_3$ powder particles of the present disclosure are such a fine powder, the tetragonality (c/a) reaches a range of about 1.007-1.01, and the crystallinity reaches about 93-96%. Such properties are markedly improved ones in considering that the tetragonality (c/a) of a general $BaTiO_3$ powder manufactured by the conventional solid phase synthesis is just about 1.0032, and the crystallinity is just about 88%. A general $BaTiO_3$ powder manufactured by the conventional hydrothermal synthesis loses such tetragonality and has a cubic structure.

In addition, the $BaTiO_3$ powder particles according to the present disclosure has a spherical shape or a pseudo spherical shape, having a particle aspect ratio in a range of about 1:1.090-1:1.500, preferably, a spherical shape of about 1.097, and this is an approximate value to about 1.0017 that is the general particle aspect ratio of $BaTiO_3$ powder particles manufactured by a general hydrothermal synthesis. Due to such spherical-shape powder particles, if applied to the mass production of MLCC, the higher densification of a dielectric powder in the MLCC may be achieved, and the dielectric properties of the mass-produced MLCC may be largely improved.

That is, as described above, the $BaTiO_3$ powder particles according to the present disclosure are fine particles but have very high tetragonality (c/a) and crystallinity, and have all advantages of the $BaTiO_3$ powder particles manufactured by the conventional solid phase synthesis and the $BaTiO_3$ powder particles manufactured by the conventional hydrothermal synthesis.

In an embodiment of the present disclosure, the $BaTiO_3$ ultra-fine powder may be manufactured by using known methods including a hydrothermal synthesis, a co-precipitation method, an alkoxide method, or the like, but the hydrothermal synthesis is preferable.

Figure 4:
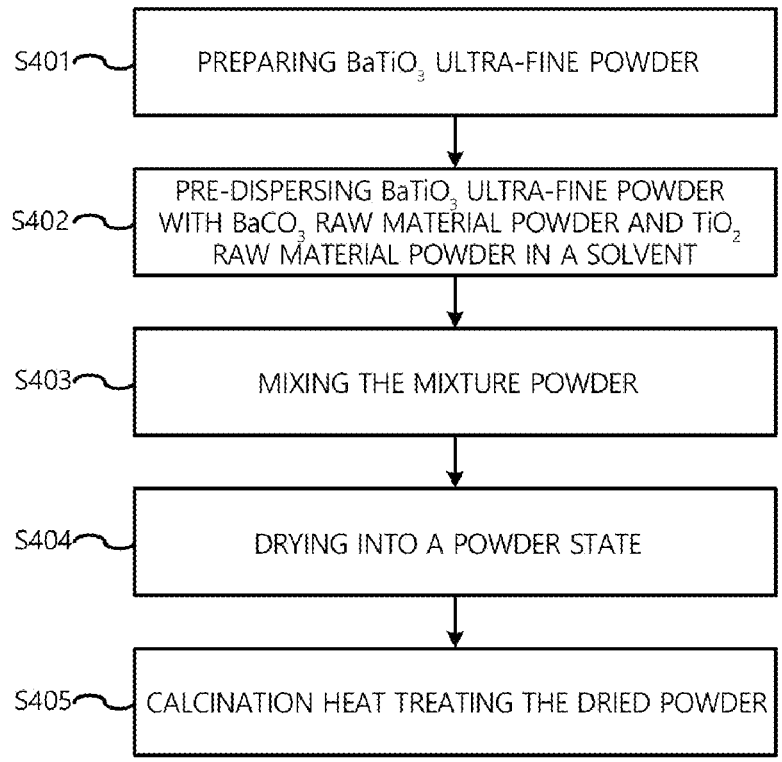
FIG. 4 is a flowchart explaining the manufacturing method of the $BaTiO_3$ powder according to the present disclosure.

FIG. 4 is a flowchart explaining the manufacturing method of the $BaTiO_3$ powder according to the present disclosure. As shown in FIG. 4, the $BaTiO_3$ powder according to the present disclosure is manufactured by the steps below.

(i) First, a $BaTiO_3$ ultra-fine powder is prepared (S401), and a mixture powder of the $BaTiO_3$ ultra-fine powder, a $BaCO_3$ raw material powder and a $TiO_2$ raw material powder is pre-dispersed (pre-mixing) in a solvent (S402).

In this case, as described above, in an embodiment of the present disclosure, the $BaTiO_3$ ultra-fine powder may be prepared by a known hydrothermal synthesis. For an example, barium hydroxide octahydrate ($Ba(OH)_2 \cdot 8H_2O$) and titanium oxide hydrate ($TiO_2 \cdot xH_2O$) may be mixed and reacted in a container for hydrothermal synthesis with a filling ratio of 80% at a temperature of about 170° C. for about 5 hours to prepare barium titanate seeds, and then the seeds may be allowed to undergo grain growth in a hydrothermal reactor to manufacture the $BaTiO_3$ ultra-fine powder.

In the present disclosure, the amount of the $BaTiO_3$ ultra-fine powder to be mixed with the $BaCO_3$ raw material powder and the $TiO_2$ raw material powder is about 5-95 wt %, preferably, 25-75 wt %, most preferably, 25-50 wt % based on the total weight of the mixture powder.

In addition, in the present disclosure, since the $BaTiO_3$ ultra-fine powder is a nano-size powder and is liable to be of an agglomerated state, the pre-mixing process (S402) is performed for previously dispersing such agglomerates well and for mixing the $BaCO_3$ raw material powder and the $TiO_2$ raw material powder well. Such a pre-mixing plays a big role in securing the uniform particle size properties and tetragonality of the mixture powder particles. For the pre-mixing in an embodiment of the present disclosure, the solvent may be selected from ethanol or de-ionized water, a known dispersant may be added thereto, and the mixture powder may be mixed for about 2 hours. Of course, in another embodiment of the present disclosure, such a pre-mixing process (S402) may be omitted, and a mixing process (S403) described below may be performed immediately.

(ii) Then, the mixture is mixed (S403) and dried into a powder state (S404).

(iii) Then, the dried powder undergoes calcination heat treatment (S405).

According to an embodiment of the present disclosure, the calcination temperature may be about 900-1000° C., and a holding time may be about 1-4 hours. In addition, the calcination treatment may be performed, for an example, in an air atmosphere, and the temperature rising rate to the calcination heating temperature may be set to, for an example, about 1° C./min. In addition, after finishing the heating, in an embodiment, the powder may be cooled down in a furnace in the air.

In addition, in an embodiment of the present disclosure, the calcined powder may have an average particle diameter ($D_{50}$) in a range of 140-270 nm, and may be sieved and classified into predetermined grades.

Hereinafter, the present disclosure will be explained by various embodiments. However, the present disclosure is not limited thereto but by the claims.

EXAMPLES

In order to manufacture $BaTiO_3$ with high tetragonality using a solid phase synthesis, $BaCO_3$ (average particle diameter ($D_{50}$): 203±82 nm), $TiO_2$ (average particle diameter ($D_{50}$): 123±39 nm) and a dispersant (BYK111) were used, and a $BaTiO_3$ ultra-fine powder with an average particle diameter ($D_{50}$) of 50 nm was used. The $BaTiO_3$ ultra-fine powder could be prepared by a known hydrothermal synthesis. For example, by a common process, barium hydroxide octahydrate ($Ba(OH)_2 \cdot 8H_2O$) and titanium oxide hydrate ($TiO_2 \cdot xH_2O$) were mixed and reacted in a container for hydrothermal synthesis with a filling ratio of 80% at a temperature of 170° C. for 5 hours to prepare barium titanate seeds, and the seeds were allowed to undergo grain growth in a hydrothermal reactor to manufacture the $BaTiO_3$ ultra-fine powder. The synthesis was performed by weighing each as in Table 1 below. In Table 1, "seed BT" refers to the $BaTiO_3$ ultra-fine powder.

TABLE 1

| | Raw material powder | | | | |
|---|---|---|---|---|---|
| | Seed BT (g) | $BaCO_3$ (g) Conditions | $TiO_2$ (g) | Dispersant | Ethanol |
| | 50 nm | 203 ± 82 nm | 123 ± 39 nm | (ml) | (ml) |
| Input amount (0 wt %) | 0.00 | 986.70 | 399.33 | 8.32 | 2360 |
| Input amount (25 wt %) | 346.50 | 740.03 | 299.50 | 8.32 | 2360 |
| Input amount (50 wt %) | 693.00 | 493.35 | 199.67 | 8.32 | 2360 |
| Input amount (75 wt %) | 1039.50 | 246.68 | 99.83 | 8.32 | 2360 |
| Input amount (100 wt %) | 1386.00 | 0 | 0 | 8.32 | 2360 |

The mixture according to the composition of Table 1 above was pre-mixed for about 2 hours using an In-line mixer in a rate of 2000 rpm, and the slurry thus pre-mixed was milled for 3 hours using a basket mill. Then, the slurry thus synthesized was dried using a spray dryer under conditions of an input temperature of 230° C. and a disc rate of 5000 rpm into a mixture powder, and this powder was calcination treated with a temperature rising rate of 1° C./min and holding conditions of 900-1000° C. for 1-4 hours to manufacture the $BaTiO_3$ powder of the present disclosure.

After that, a PVB-based binder, a dispersant, a plasticizer, or the like were added to the $BaTiO_3$ powder of the present disclosure, manufactured by various calcination heating conditions, to manufacture slurries for manufacturing dielectric sheets. The slurry thus manufactured was formed into a dielectric sheet with a thickness of about 27 μm by using a tape casting method, and total 20 sheets thus manufactured were laminated, undergone pressurizing/removing binder processes, and sintered under holding conditions of about 1000-1300° C. for 1-4 hours to manufacture a final chip for MLCC.

Meanwhile, for the comparison with the compositions of the Examples of the present disclosure, the conventional $BaTiO_3$ powders were manufactured by the conventional hydrothermal synthesis and solid phase synthesis, respectively. By the hydrothermal synthesis, barium hydroxide octahydrate ($Ba(OH)_2 \cdot 8H_2O$) and titanium dioxide hydrate ($TiO_2 \cdot xH_2O$) were mixed and reacted at a temperature of 170° C. in a container with a filling ratio of 80% for 5 hours to manufacture barium titanate seeds. The seeds were undergone grain growth in a hydrothermal reactor to manufacture the conventional $BaTiO_3$ powder. By the solid phase synthesis, $BaCO_3$ (average particle diameter ($D_{50}$): 203±82 nm), $TiO_2$ (average particle diameter ($D_{50}$): 123±39 nm) and a dispersant (BYK111) were mixed, milled and dried, and then, at the temperature rising rate of 1° C./min, maintained at 1000° C. for 4 hours in an air atmosphere. Then, the powder was cooled down in a furnace to manufacture the conventional $BaTiO_3$ powder.

The crystal structure, tetragonality and crystallinity of each of various $BaTiO_3$ powders of various compositions thus manufactured were analyzed using an XRD (Philips X'Pert Pro X-ray diffractometer), and the tetragonality was analyzed by Rietveld refinement analysis. The microstructures of the powders thus manufactured were analyzed through electron micrographs using FE-SEM (TESCAN CLARA, Czech Republic). In addition, In—Ga metals were attached to the chip thus manufactured to form electrodes on both sides, and the changes of the dielectric properties were evaluated in a frequency range of 100 Hz to 1 MHz using a LCR meter.

(1) Analysis of Tetragonality (c/a) and Crystallinity

Figure 5A:
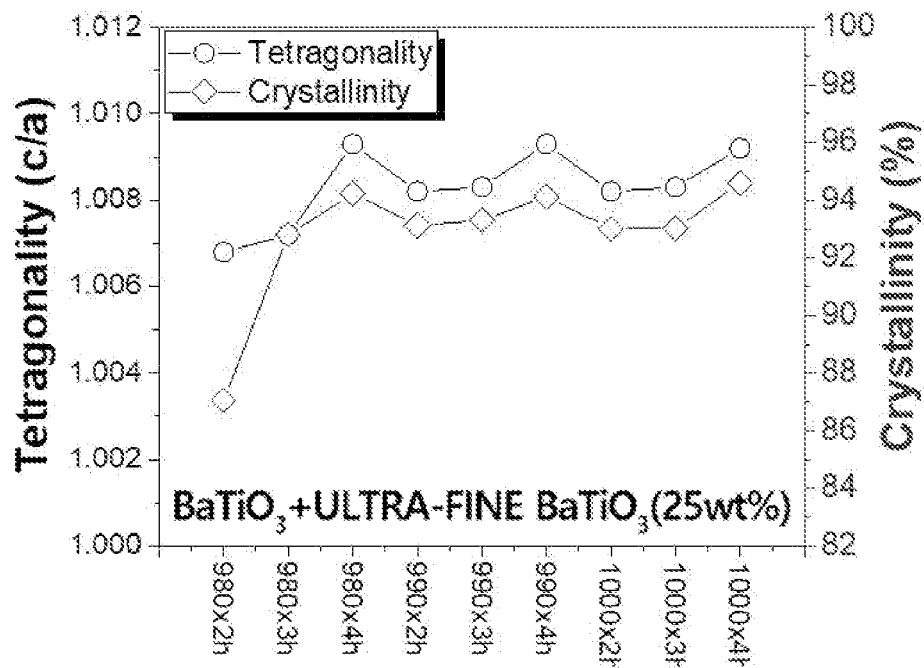
FIGS. 5A-5C are graphs showing the changes of tetragonality (c/a) and crystallinity in accordance with the compositions and temperature conditions of calcination heat treatment of $BaTiO_3$ powders manufactured according to embodiments of the present disclosure, where FIG. 5A corresponds to a composition of [$BaCO_3$ raw material powder+$TiO_2$ raw material powder+25 wt % of $BaTiO_3$ ultra-fine powder], FIG. 5A corresponds to a composition of [$BaCO_3$ raw material powder+$TiO_2$ raw material powder+50 wt % of $BaTiO_3$ ultra-fine powder], and FIG. 5C corresponds to a composition of [$BaCO_3$ raw material powder+$TiO_2$ raw material powder+75 wt % of $BaTiO_3$ ultra-fine powder]. Here, the x-axis means Calcination heat treatment temperature×Holding time at the temperature.
Figure 5B:
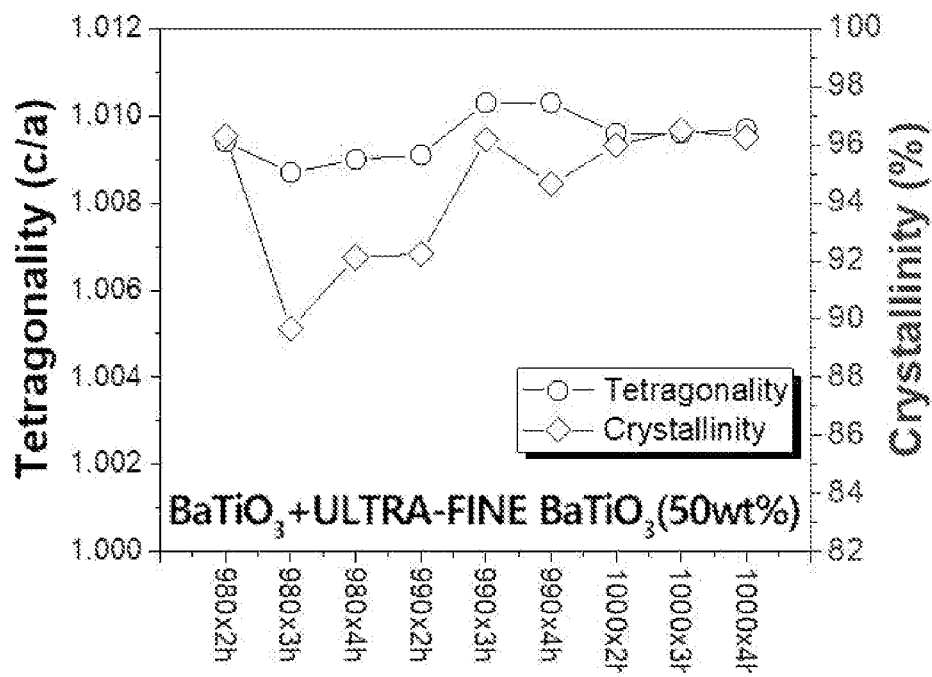
Figure 5C:
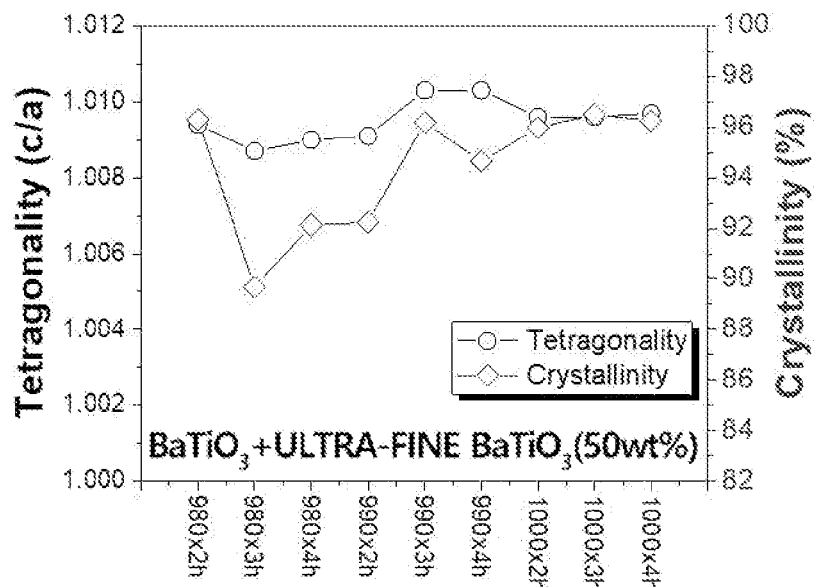

FIGS. 5A-5C are graphs showing the changes of tetragonality (c/a) and crystallinity in accordance with the compositions and temperature conditions of calcination heat treatment of $BaTiO_3$ powders manufactured according to embodiments of the present disclosure, where FIG. 5A corresponds to a composition of [$BaCO_3$ raw material powder+$TiO_2$ raw material powder+25 wt % of $BaTiO_3$ ultra-fine powder], FIG. 5A corresponds to a composition of [$BaCO_3$ raw material powder+$TiO_2$ raw material powder+50 wt % of $BaTiO_3$ ultra-fine powder], and FIG. 5C corresponds to a composition of [$BaCO_3$ raw material powder+$TiO_2$ raw material powder+75 wt % of $BaTiO_3$ ultra-fine powder]. Here, the x-axis means Calcination heat treatment temperature×Holding time at the temperature.

Figure 6A:
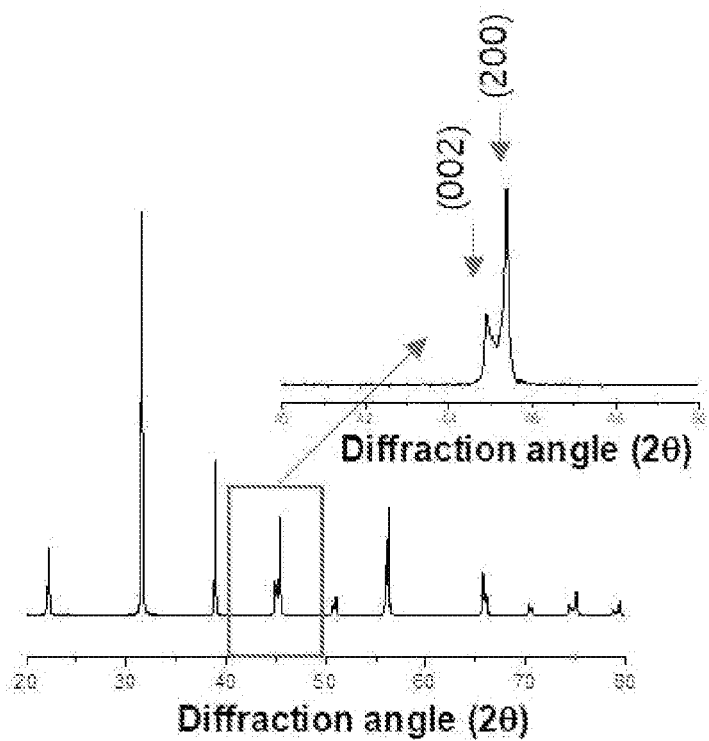
FIG. 6A shows X-ray diffraction analysis results of a $BaTiO_3$ powder manufactured using the composition of [$BaCO_3$ raw material powder+$TiO_2$ raw material powder+25 wt % of $BaTiO_3$ ultra-fine powder] of FIG. 5A according to an embodiment of the present disclosure.
Figure 6B:
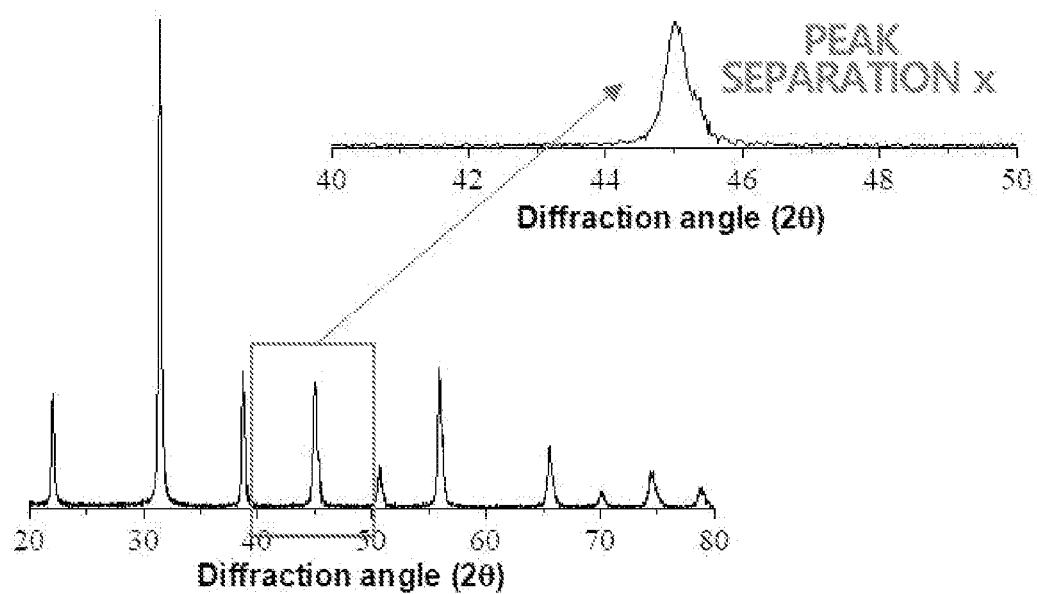
FIG. 6B shows X-ray diffraction analysis results of a conventional $BaTiO_3$ powder manufactured by the conventional hydrothermal synthesis as a comparative embodiment.
Figure 6C:
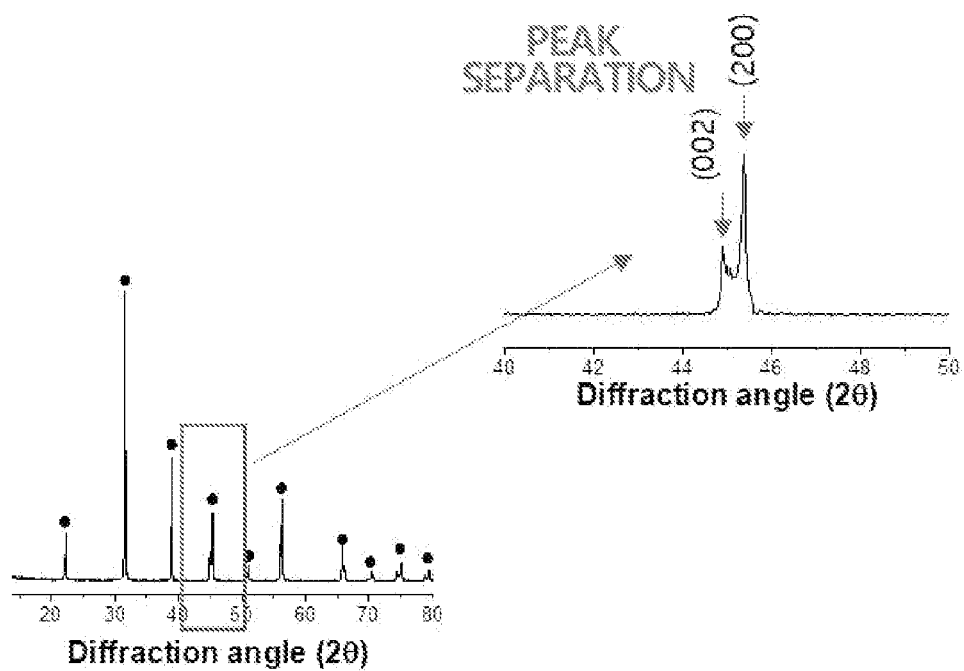
FIG. 6C shows X-ray diffraction analysis results of a conventional $BaTiO_3$ powder manufactured by the conventional solid phase synthesis as a comparative embodiment.

In addition, FIG. 6A shows X-ray diffraction analysis results of a $BaTiO_3$ powder manufactured using the composition of [$BaCO_3$ raw material powder+$TiO_2$ raw material powder+25 wt % of $BaTiO_3$ ultra-fine powder] of FIG. 5A according to an embodiment of the present disclosure, FIG. 6B shows X-ray diffraction analysis results of a conventional $BaTiO_3$ powder manufactured by the conventional hydrothermal synthesis as a comparative embodiment, and FIG. 6C shows X-ray diffraction analysis results of a conventional $BaTiO_3$ powder manufactured by the conventional solid phase synthesis as a comparative embodiment.

Figure 7:
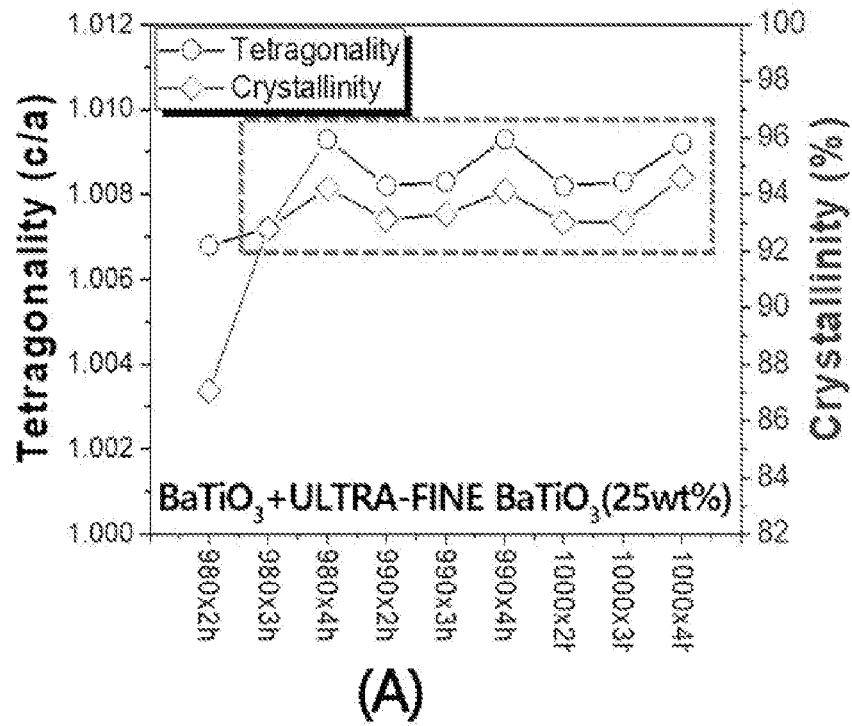
FIG. 7 shows a graph showing the changes of the tetragonality (c/a) and crystallinity properties of a $BaTiO_3$ powder manufactured using the composition of [$BaCO_3$ raw material powder+$TiO_2$ raw material powder+25 wt % of $BaTiO_3$ ultra-fine powder] of FIG. 5A according to an embodiment of the present disclosure (A), and a graph showing the changes of the tetragonality (c/a) and crystallinity properties of the conventional $BaTiO_3$ powder manufactured by the conventional solid phase synthesis as a comparative embodiment (B). Here, the x-axis means Calcination heat treatment temperature×Holding time at the temperature.
Figure 7:
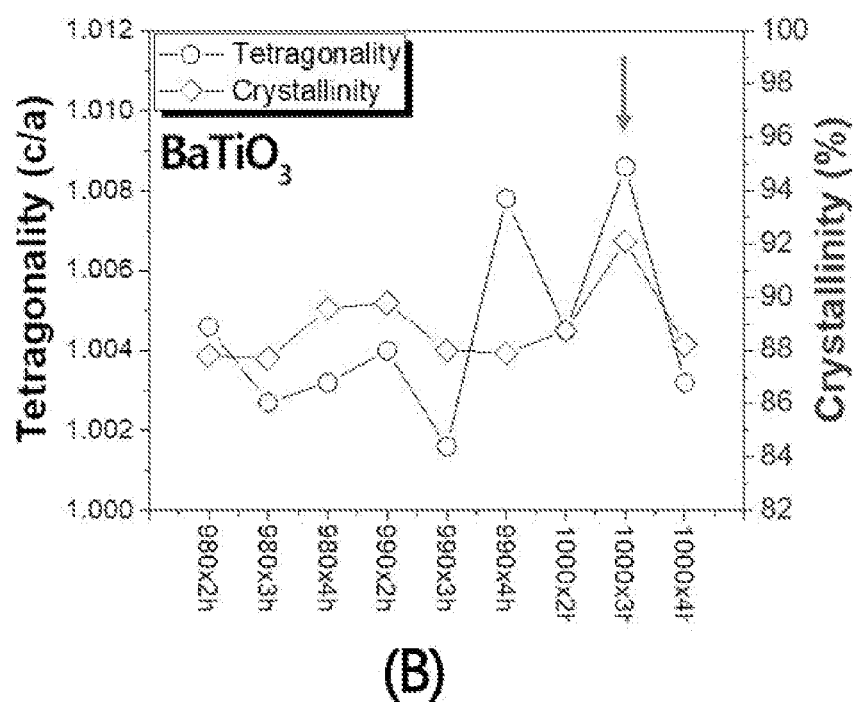

In addition, FIG. 7 shows a graph showing the changes of the tetragonality (c/a) and crystallinity properties of a $BaTiO_3$ powder manufactured using the composition of [$BaCO_3$ raw material powder+$TiO_2$ raw material powder+25 wt % of $BaTiO_3$ ultra-fine powder] of FIG. 5A according to an embodiment of the present disclosure (A of FIG. 7), and a graph showing the changes of the tetragonality (c/a) and crystallinity properties of the conventional $BaTiO_3$ powder manufactured by the conventional solid phase synthesis as a comparative embodiment (B of FIG. 7). Here, the x-axis means Calcination heat treatment temperature×Holding time at the temperature.

Figure 3:
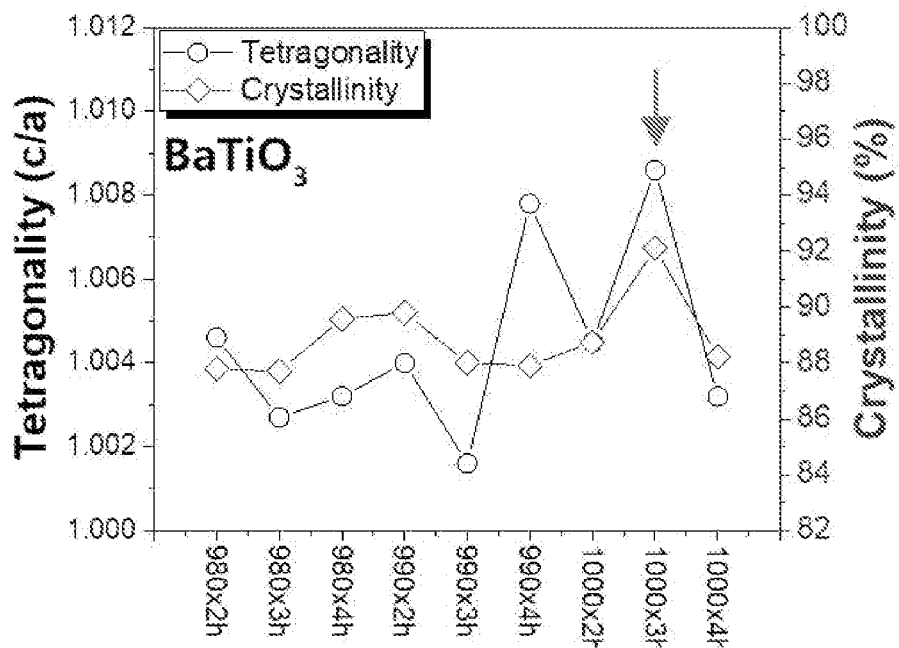
FIG. 3 shows tetragonality (c/a) and crystallinity in accordance with various temperature conditions of calcination heat treatment of the $BaTiO_3$ powder manufactured by a solid phase synthesis (B) of FIG. 1, and the x-axis means Calcination heat treatment temperature×Holding time at the temperature.

Referring to FIGS. 5A-5C, it could be found that by adding the $BaTiO_3$ ultra-fine powder to the composition according to the present disclosure, the properties of the tetragonality (c/a) and crystallinity were markedly improved on the whole and the degree of tetragonality was markedly improved in contrast to those of the BaTiO₃ powder manufactured by the conventional solid phase synthesis (see FIG. 3). With the increase of the amount of the BaTiO₃ ultra-fine powder added (i.e., from FIG. 5A toward FIG. 5C), the tetragonality and crystallinity got gradually worse, but with the composition of the present disclosure, having the amount of the BaTiO₃ ultra-fine powder added of 50 wt % or less, the tetragonality and crystallinity were still better than those of the conventional BaTiO₃ powder.

In addition, as shown in FIG. 6B, the BaTiO₃ powder manufactured by a hydrothermal synthesis is generally a fine powder and shows a cubic structure in which peaks are not separated in an X-ray diffraction analysis, and dielectric properties were degraded. However, different from this, as shown in FIG. 6A, the composition in which the BaTiO₃ ultra-fine powder was added according to the present disclosure is a fine powder, but has a tetragonal structure in which peaks are separated like the BaTiO₃ powder manufactured by the conventional solid phase synthesis. Further, the tetragonality of the composition of the present disclosure is markedly increased when compared to the composition manufactured by the conventional solid phase synthesis, as examined in FIGS. 5A-5C.

In addition, generally, for the application to a dielectric element such as MLCC, such conditions that the tetragonality (c/a) has a value of about 1.0070 or more at about 300 k are required. Referring to FIG. 7 in this consideration, in the case of the general BaTiO₃ powder manufactured by the conventional solid phase synthesis (B of FIG. 7), only the powder manufactured under a specific heating condition designated by an arrow is applicable to a dielectric element such as MLCC, but in the case of the composition in which the BaTiO₃ ultra-fine powder was added according to the present disclosure (A of FIG. 7), the conditions were satisfied under various heating conditions as shown by a dotted line, all are applicable to a dielectric element such as MLCC. Further, all the compositions of the present disclosure have excellent properties with a markedly greater tetragonality (c/a) value than that of the comparative embodiments.

(2) Analysis of Particle Aspect Ratio

Figure 8:
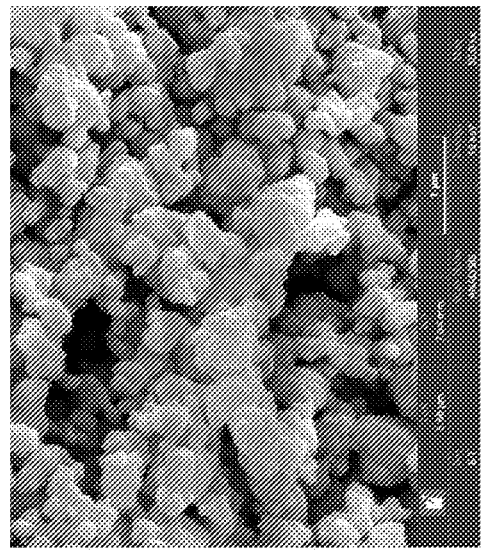
FIG. 8 shows an electron micrograph of a $BaTiO_3$ powder manufactured using the composition of [$BaCO_3$ raw material powder+$TiO_2$ raw material powder+25 wt % of $BaTiO_3$ ultra-fine powder] of FIG. 5A according to an embodiment of the present disclosure (A), and an electron micrograph of the conventional $BaTiO_3$ powder manufactured by the conventional solid phase synthesis as a comparative embodiment (B). (A) and (B) are of the same magnification.
Figure 8:
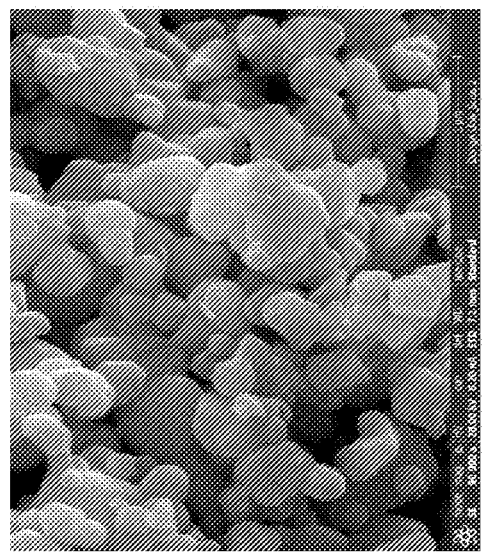

FIG. 8 shows an electron micrograph of a BaTiO₃ powder manufactured using the composition of [BaCO₃ raw material powder+TiO₂ raw material powder+25 wt % of BaTiO₃ ultra-fine powder] of FIG. 5A according to an embodiment of the present disclosure (A of FIG. 8), and an electron micrograph of the conventional BaTiO₃ powder manufactured by the conventional solid phase synthesis as a comparative embodiment (B of FIG. 8), with the same magnification.

Referring to FIG. 8, the case of the composition of the comparative embodiment (B) shows very large agglomeration among the BaTiO₃ powder particles and spreading of particle size distribution, whereas the case of the composition of the present disclosure (A) shows high dispersibility among the BaTiO₃ powder particles and uniform particle size distribution.

In addition, in the case of the composition of the comparative embodiment (B), the particle aspect ratio of the BaTiO₃ powder particles is about 1.5, whereas in the case of the composition of the present disclosure (A), the particle aspect ratio of the BaTiO₃ powder particles is about 1.0097, which corresponds to a spherical shape close to about 1.0017 which is the general particle aspect ratio of the BaTiO₃ powder particles manufactured by the general hydrothermal synthesis. In the present disclosure, the closer the shape of the BaTiO₃ powder particles are to a sphere, the more its specific surface area decreases, and such a decreased specific surface area of the powder particles enables manufacturing a dielectric sheet with using less amount of a binder in the mass production process of MLCC. From this, eventually a higher densification of a dielectric powder in the MLCC may be achieved and the dielectric properties of the mass-produced MLCC may be improved.

(3) Analysis of Dielectric Properties

Figure 9A:
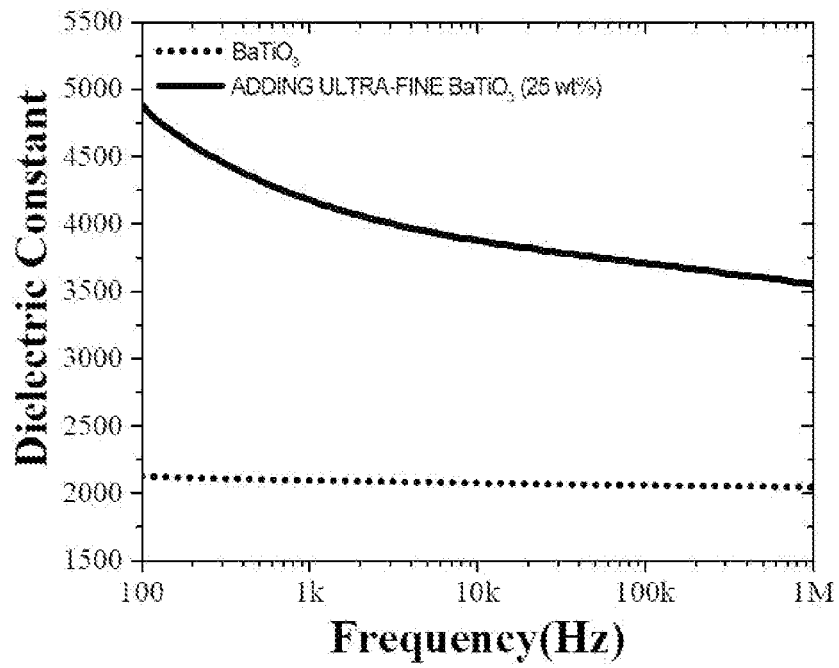
Figure 9B:
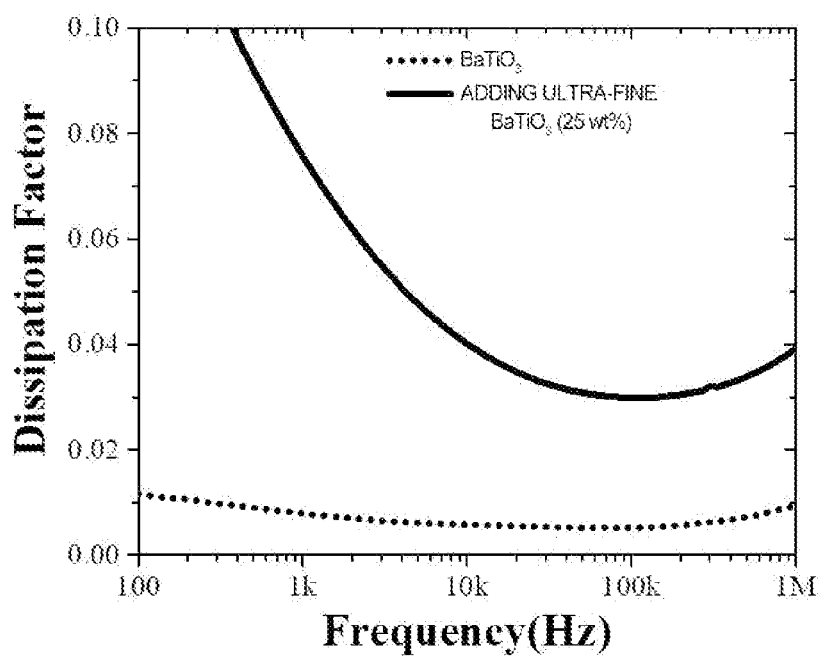

FIGS. 9A-9B show evaluation graphs on the dielectric properties of chips manufactured by manufacturing a dielectric sheet using a BaTiO₃ powder of the composition of [BaCO₃ raw material powder+TiO₂ raw material powder+25 wt % of BaTiO₃ ultra-fine powder] of FIG. 5A according to an embodiment of the present disclosure, laminating the sheets, and sintering them under holding conditions of about 1300° C. for 2 hours, wherein FIG. 9A shows the change of dielectric properties, and FIG. 9B shows the change of dielectric loss, and the changes of the properties of dielectricity ($\varepsilon_r$) and dielectric loss (tan δ) of the conventional BaTiO₃ powder manufactured by the conventional solid phase synthesis are shown together as a comparative embodiment.

Referring to FIGS. 9A-9B, the composition in which the BaTiO₃ ultra-fine powder was added according to the present disclosure shows markedly better dielectric constant and dielectric loss than those of the composition of the conventional BaTiO₃ powder. Particularly, in the case of the dielectric constant, at 1 kHz and 1 V, the composition of the conventional BaTiO₃ powder had 2120, whereas the composition of the present disclosure had 4211 which was largely increased by twice or more.

For comparison, Table 2 below summarizes the general properties obtained by measuring and analyzing as above for the BaTi₃ powder of the composition of [BaCO₃ raw material powder+TiO₂ raw material powder+25 wt % of BaTiO₃ ultra-fine powder] of FIG. 5A according to the Example of the present disclosure and for the conventional BaTiO₃ powder of the composition manufactured by the conventional solid phase synthesis as the Comparative Example.

TABLE 2

|  | Comparative Example (Composition of BaTiO₃ powder manufactured by the conventional solid phase synthesis) | Example of the present disclosure (Composition of [BaCO₃ raw material powder + TiO₂ raw material powder + 25 wt % of BaTiO₃ ultra-fine powder]) |
|---|---|---|
| Average particle diameter ($D_{50}$) | 250~500 nm | 20~120 nm |
| Tetragonality (c/a) | 1.0032 | 1.0092 |
| Crystallinity (%) | 88.22 | 94.6 |
| Dielectric constant (∈) | 2120 | 4211 |
| Dielectric loss | 0.011 | 0.08 |
| Shape (aspect ratio) | 1.5 | 1.097 (0.426/0.388) |

As in Table 2, the composition in which the BaTiO₃ ultra-fine powder was added according to the present disclosure showed markedly improved tetragonality (c/a) and crystallinity than the BaTiO₃ powder composition manufactured by the conventional solid phase synthesis and showed markedly improved dielectric properties.

Also, the BaTiO₃ ultra-fine powder particles of the composition of the present disclosure are fine particles being close to a spherical shape close as likely as the $BaTiO_3$ powder particles manufactured by the general hydrothermal synthesis, and accordingly, as described above, when being applied to the mass production of MLCC, the higher densification of the dielectric powder in the MLCC may be achieved, and at the same time, the dielectric properties of the mass-produced MLCC may be largely improved.

As described above, the present disclosure may manufacture a $BaTiO_3$ powder which is approximately spherical fine particles having an average particle diameter ($D_{50}$) in a range of about 140-270 nm and has markedly improved tetragonality (c/a) and crystallinity both and thus has improved dielectric properties, through synthesizing by heat treatment of a mixture powder of a $BaCO_3$ powder and a $TiO_2$ powder, which are raw material powders generally used in the solid phase synthesis of $BaTiO_3$, together with a $BaTiO_3$ ultra-fine powder by a solid phase synthesis. In case when the $BaTiO_3$ powder particles according to the present disclosure are applied for the manufacture of MLCC, higher densification may be achieved, and dielectric properties may be largely improved.

In the above, in the embodiments and examples of the present disclosure, it should be understood that there are some changes within a typical margin of error according to powder properties such as the average particle diameter, distribution and specific surface area of a composition powder, the crystallinity of raw materials, the addition amount of impurities and sintering conditions, by a person skilled in the art.

Although the barium titanate powder and the manufacturing method thereof have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A manufacturing method of a barium titanate powder, the method comprising:
    mixing a barium carbonate ($BaCO_3$) powder, a titanium dioxide ($TiO_2$) powder, and a barium titanate ($BaTiO_3$) ultra-fine powder, as raw material powders, and drying a mixture powder, an average particle diameter ($D_{50}$) of the barium titanate ultra-fine powder being selected in a range of 20-120 nm; and
    heat treating the mixture powder in a temperature range of 900-1000° C. to obtain a final barium titanate powder.

2. The manufacturing method of a barium titanate powder of claim 1, wherein an average particle diameter ($D_{50}$) of the barium carbonate powder is set in a range of 70-300 nm.

3. The manufacturing method of a barium titanate powder of claim 1, wherein an average particle diameter ($D_{50}$) of the titanium dioxide powder is set in a range of 80-170 nm.

4. The manufacturing method of a barium titanate powder of claim 1, wherein the amount of the barium titanate ultra-fine powder is set in a range of 5-95 wt % based on a total weight of the mixture powder.

5. The manufacturing method of a barium titanate powder of claim 1, wherein the amount of the barium titanate ultra-fine powder is set in a range of 25-50 wt % based on a total weight of the mixture powder.

6. The manufacturing method of a barium titanate powder of claim 1, wherein the mixing comprises mixing by pre-mixing the barium carbonate powder, the titanium dioxide powder and the barium titanate ultra-fine powder in a solvent for a pre-determined time, and then milling.

7. The manufacturing method of a barium titanate powder of claim 6, wherein the solvent in the pre-mixing is one or both of ethanol and de-ionized water, and the solvent comprises a dispersant.

8. A manufacturing method of a barium titanate powder, the method comprising:
    mixing a barium carbonate ($BaCO_3$) powder, a titanium dioxide ($TiO_2$) powder, and a barium titanate ($BaTiO_3$) ultra-fine powder, as raw material powders, an average particle diameter ($D_{50}$) of the barium titanate ultra-fine powder being selected in a range of 20-120 nm; and
    heat treating the mixture powder thus mixed to obtain a final barium titanate powder,
    wherein the heat treating is performed in a temperature range of 900-1000° C.

9. The manufacturing method of a barium titanate powder of claim 8, wherein the heat treating is performed in the temperature range for 1-4 hours.

10. The manufacturing method of a barium titanate powder of claim 8, wherein the heat treating is performed in the air.

11. A manufacturing method of a barium titanate powder, the method comprising:
    mixing a barium carbonate ($BaCO_3$) powder, a titanium dioxide ($TiO_2$) powder, and a barium titanate ($BaTiO_3$) ultra-fine powder, as raw material powders, an average particle diameter ($D_{50}$) of the barium titanate ultra-fine powder being selected in a range of 20-120 nm; and
    heat treating the mixture powder thus mixed to obtain a final barium titanate powder, wherein the final barium titanate powder obtained by the heat treating has an average particle diameter ($D_{50}$) in a range of 140-270 nm and a tetragonal structure with a tetragonality (c/a) in a range of 1.007-1.01.

12. The manufacturing method of a barium titanate powder of claim 11, wherein the final barium titanate powder obtained by the heat treating has a crystallinity in a range of 93-96%.

13. The manufacturing method of a barium titanate powder of claim 11, wherein the final barium titanate powder obtained by the heat treating has a spherical or pseudo spherical shape with an aspect ratio in a range of 1:1.090-1:1.500.

* * * * *